United States Patent
Ahn et al.

(10) Patent No.: US 8,483,257 B2
(45) Date of Patent: Jul. 9, 2013

(54) METHOD FOR TRANSMITTING DATA USING FREQUENCY HOPPING SCHEME AND METHOD FOR DETERMINING A SUB-BAND FOR THE FREQUENCY HOPPING

(75) Inventors: Joon Kui Ahn, Anyang-si (KR); Ki Jun Kim, Anyang-si (KR); Jung Hoon Lee, Anyang-si (KR); Suk Hyon Yoon, Anyang-si (KR)

(73) Assignee: LG Electronics Inc., Seoul (KR)

(*) Notice: Subject to any disclaimer, the term of this patent is extended or adjusted under 35 U.S.C. 154(b) by 1048 days.

(21) Appl. No.: 12/521,469

(22) PCT Filed: Jan. 9, 2008

(86) PCT No.: PCT/KR2008/000125
§ 371 (c)(1),
(2), (4) Date: Jun. 26, 2009

(87) PCT Pub. No.: WO2008/084977
PCT Pub. Date: Jul. 17, 2008

(65) Prior Publication Data
US 2009/0316758 A1    Dec. 24, 2009

Related U.S. Application Data

(60) Provisional application No. 60/884,194, filed on Jan. 9, 2007.

(30) Foreign Application Priority Data

Aug. 9, 2007  (KR) .................. 10-2007-0080313

(51) Int. Cl.
*H04B 1/00*   (2006.01)

(52) U.S. Cl.
USPC ........... 375/135; 375/267; 375/299; 370/319; 370/341; 370/436

(58) Field of Classification Search
USPC ................. 375/130, 133, 135, 260, 267, 295, 375/299; 370/319, 321, 322, 329, 341, 348, 370/431, 436, 441, 442; 455/509, 91, 101, 455/103
See application file for complete search history.

(56) References Cited

U.S. PATENT DOCUMENTS

| | | |
|---|---|---|
| 2005/0281242 A1 | 12/2005 | Sutivong et al. |
| 2006/0092869 A1* | 5/2006 | Herrmann ................. 370/314 |
| 2006/0140251 A1 | 6/2006 | Brown et al. |
| 2008/0008206 A1* | 1/2008 | Cho et al. .................. 370/430 |
| 2008/0310359 A1* | 12/2008 | McBeath et al. ............. 370/329 |

FOREIGN PATENT DOCUMENTS

WO  WO 2006/062355 A1  6/2006

* cited by examiner

*Primary Examiner* — Dac Ha
(74) *Attorney, Agent, or Firm* — Birch, Stewart, Kolasch & Birch, LLP

(57) ABSTRACT

A frequency hopping scheme in a communication system using a plurality of sub-carriers is disclosed. A sub-band for frequency hopping is set and the frequency hopping scheme is applied using the set sub-band. The frequency hopping scheme is applied in the communication system by assigning a virtual index to a resource block including one or more sub-carriers and transforming the virtual index according to a specific rule to acquire a virtual index of a next resource block for the frequency hopping.

9 Claims, 9 Drawing Sheets sub-band for frequency hopping sub-band for frequency hopping

METHOD FOR TRANSMITTING DATA USING FREQUENCY HOPPING SCHEME AND METHOD FOR DETERMINING A SUB-BAND FOR THE FREQUENCY HOPPING

This application is the National Phase of PCT/KR2008/000125 filed on Jan. 9, 2008, which claims priority under 35 U.S.C. 119(e) to U.S. Provisional Application No. 60/884,194 filed on Jan. 9, 2007 and under 35 U.S.C. 119(a) to Patent Application No. 10-2007-0080313 filed in Republic of Korea on Aug. 9, 2007, all of which are hereby expressly incorporated by reference into the present application.

TECHNICAL FIELD

The present invention relates to a mobile communication system, and more particularly, to a method for transmitting data in a mobile communication system using a frequency hopping scheme and a method for determining a sub-band for frequency hopping in a mobile communication system.

BACKGROUND ART

In a multi-carrier cellular mobile communication system, frequency hopping scheme has been proposed for obtaining frequency diversity to increase reception performance of a base station with respect to a packet that an user equipment (UE) transmits through an uplink. According to the frequency hopping scheme, the spectrum of a carrier modulated by an information signal is transmitted by hopping within a certain wide frequency band.

This scheme is mainly used in an anti-jamming system for preventing the effect of jamming, which is a signal degrading the performance of a communication system either intentionally or unintentionally. This scheme is also mainly used in a communication system where many users share a common channel.

The frequency hopping scheme can be used to provide a sensitivity improvement for slow fading and improve a carrier to interference (C/I) margin in a cellular wireless telephone system.

DISCLOSURE

Technical Problem

An object of the present invention with relation to the Background Art lies on a method for transmitting data using a frequency hopping scheme and a method for determining a sub-band for frequency hopping when it is used.

Technical Solution

The object of the present invention can be achieved by providing a method for transmitting data in a mobile communication system, comprising: transmitting a first data through a first sub-band among a plurality of sub-bands to which a predetermined frequency hopping scheme is applied; and transmitting a second data through a second sub-band among the plurality of sub-bands, wherein the first sub-band and the second sub-band have a same size of bandwidth, and the first data and the second data are data for a same user.

The second sub-band may be determined according to a hopping order defined with respect to the plurality of sub-bands to which the frequency hopping scheme is applied.

Also, the first data and the second data may included in one data packet and are transmitted through a first slot and a second slot in a same transmission time interval (TTI), respectively. Or, the second data is transmitted in a TTI subsequent to a TTI in which the first data is transmitted.

The second data may be a retransmission data of the first data. Here, the retransmission may include retransmission based on an HARQ scheme.

The first data and the second data may be transmitted through a part of the first sub-band and a part of the second sub-band, respectively.

The plurality of sub-bands to which the frequency hopping scheme is applied may be determined as 1) all sub-bands of one or more specific retransmission groups, 2) a part of sub-bands of one or more specific retransmission groups, or 3) a part of sub-bands of all retransmission groups.

The first data and the second data may be transmitted according to the predetermined frequency hopping scheme without scheduling information about the predetermined frequency hopping scheme, if scheduling information instructing to transmit the first data and the second data through the sub-bands to which the frequency hopping scheme is applied is received.

In another aspect of the present invention, provided herein is a method for transmitting data in a mobile communication system, the method comprising: transmitting a first data through a resource block having a first virtual index; and transmitting a second data through a resource block having a second virtual index, wherein each of the resource blocks has virtual index assigned to a corresponding node of a binary tree structure and the first data and the second data are data for a same user.

The second virtual index may be acquired from the first virtual index according to a specific rule The first data and the second data may be included in a data packet that is transmitted through a first slot and a second slot in one TTI, respectively.

On the other hand, the second data may be a retransmission data of the first data.

When one or more resource blocks are allocated for transmission of the first data, the allocated one or more resource blocks may be included in resource blocks having virtual indexes assigned to nodes belonging to a same upper node in the binary tree structure.

The method may further comprise receiving node index information.

The resource blocks may be associated with a sub-band to which a frequency hopping scheme is applied, in the system band of the mobile communication system.

In another aspect of the present invention, provided herein is a method for dividing a system band into one or more sub-bands, determining some of the one or more sub-bands as sub-bands for frequency hopping and assigning virtual indexes to one or more basic blocks included in each of the determined sub-bands using a binary tree structure to apply a frequency hopping scheme to the one or more basic blocks, the method comprising transmitting first data through a basic block assigned a first virtual index; and transmitting second data through a basic block assigned a second virtual index acquired by transforming the first virtual index according to a specific rule, wherein the first data and the second data are data for the same user.

The first data and the second data may be included in a data packet that is transmitted in one TTI. In this case, the data transmission method may further comprise transmitting third data, which is retransmission data of the second data, through a basic block assigned a third virtual index acquired by transforming the second virtual index according to the specific rule.

On the other hand, the second data may be retransmission data of the first data.

Advantageous Effects

According to the present invention, it is possible to increase efficiency of a mobile communication system. Also, it is possible to obtain more effective frequency diversity and to schedule resources more effectively.

Further, a resource block for next transmission is predetermined in case that frequency hopping scheme is applied to the system. Therefore, it is possible to reduce the amount of scheduling information.

Moreover, it is possible to prevent data packets, transmitted in a frequency hopping scheme by a plurality of user equipments (UEs) in a cell, from colliding with one another due to a control signal error, etc.

Furthermore, it is possible to effectively perform frequency hopping transmission while maintaining consecutiveness of sub-carriers through which one UE transmits a data at one time within a frequency hopping band, and preventing the packet from colliding with packets transmitted from other UEs.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
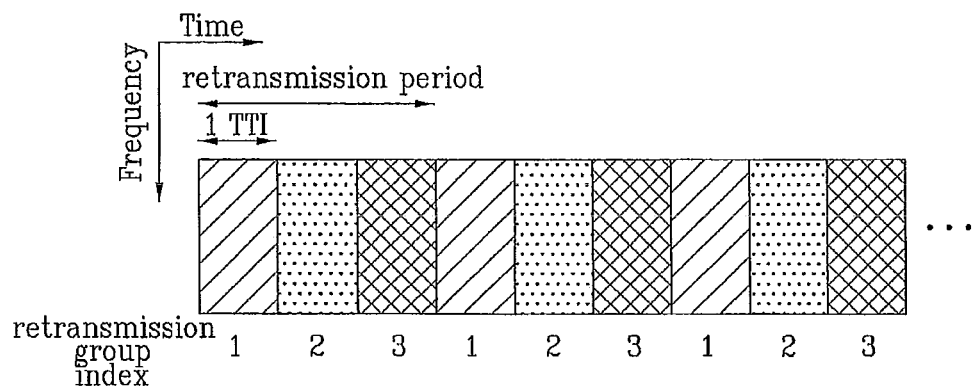
FIG. 1 is a view illustrating a retransmission group.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering around specific terms, but the present invention is not limited thereto and any other terms may be used to represent the same meanings.

In some instances, known structures and/or devices are omitted or are shown in block diagram form and/or flowchart form, focusing on important features of the structures and/or devices, so as not to obscure the concept of the present invention. Wherever possible, the same reference numbers will be used throughout this specification to refer to the same or like parts.

According to a frequency hopping scheme, one user equipment (UE) can use different frequency bands for data transmission where data of one data packet is transmitted in a transmission time interval (TTI). Alternatively, one UE may use different frequency bands for data transmission whenever retransmitting the data.

In the case where two or more different frequency bands are used with respect to one data or different frequency bands are used with respect to a data being retransmitted, as stated above, a receiving end can obtain a frequency diversity gain when receiving one data or a retransmission data of the data.

Hereinafter, the frequency hopping scheme allowing one UE to use different frequency bands for data transmission in the transmission time interval where data of one data packet is transmitted will be referred to as intra-TTI frequency hopping scheme, and the frequency hopping allowing one UE to use different frequency bands for data transmission whenever retransmitting data will be referred to as inter-retransmission frequency hopping scheme.

Because a plurality of UEs in one cell actually transmits uplink packets, there are some factors to be considered for a system design in using the frequency hopping scheme.

The first factor is a collision between, in a TTI, a UE that performs transmission using the frequency hopping scheme and a UE that does not perform transmission using the frequency hopping scheme.

For simultaneous data transmission based on a frequency division multiple access (FDMA) scheme in the TTI by the UE that performs transmission using the frequency hopping scheme and the UE that does not perform transmission using the frequency hopping scheme, it is preferable that the system be designed such that there is no collision in frequency band between a data subject to the frequency hopping scheme and a data not subject to the frequency hopping scheme in the TTI.

The second factor is a collision between a UE that performs transmission using the frequency hopping scheme and a UE that does not perform transmission using the frequency hopping scheme, when a synchronization H-ARQ scheme is applied to uplink data retransmission.

In the case where the synchronization scheme is applied to the uplink data retransmission, a time at which a retransmission data is to be transmitted is managed in such a manner that it is predefined as a relative point in a time-frequency domain used for previous transmission of the data (synchronized HARQ).

For this reason, it is preferable that the system be designed such that, during retransmission, there is no collision in time-frequency domain between retransmission data of the UE using the frequency hopping scheme and data of the UE not using the frequency hopping scheme.

The third factor is frequency consecutiveness in the case where an uplink wireless access scheme is a single carrier-frequency division multiple access (SC-FDMA) or interleaved frequency division multiple access (IFDMA) series scheme, among multi-carrier transmission schemes.

When the uplink access is made in the SC-FDMA series scheme, data transmission by one UE at one time needs to be performed through consecutive sub-carriers. For this reason, even though the intra-TTI or inter-retransmission frequency hopping is applied, it is preferable that sub-carriers through which one UE transmits a packet at one time should maintain frequency consecutiveness.

The following embodiments of the present invention propose efficient uplink frequency hopping schemes in a multi-carrier cellular mobile communication system on the assumption of one or more of the above factors to be considered.

An HARQ scheme can be classified into synchronized HARQ and asynchronized HARQ according to retransmission timings.

According to the synchronized HARQ, the subsequent retransmission is made with a timing determined by the system when the initial transmission has failed.

For example, assuming that the retransmission timing is set as every fourth time unit after the initial transmission failure, there is a need to further notify a terminal of this timing because the retransmission timing has been already appointed between a base station and the terminal. That is, if the data transmission side has received a NACK signal, the data is retransmitted in every fourth time unit until receiving an ACK signal.

In contrast, according to the asynchronized HARQ, the retransmission timing is newly scheduled and/or notified through additional signal transmission. That is, the retransmission timing for a previously failed data is variable due to various factors including a channel state.

In the case where the synchronized HARQ scheme is applied, a data transmitted in a specific TTI, failed in transmission, is retransmitted after a certain time interval. That is, a data failed in transmission is retransmitted at a certain retransmission period. Hereinafter, each TTI group connected to the retransmission period will be referred to as a retransmission group.

FIG. 1 is a view illustrating a retransmission group.

Assuming that the retransmission period is L TTIs, L retransmission groups can exist. Referring to FIG. 1, there can be seen an example in which three retransmission groups exist in a system where the retransmission period of the synchronized HARQ scheme is 3 TTIs. In other words, provided that retransmission group indexes are assigned respectively to three retransmission groups, the retransmission groups can be considered to be a first retransmission group assigned an index 1, a second retransmission group assigned an index 2, and a third retransmission group assigned an index 3.

Based on the above-stated synchronized HARQ scheme, a UE having transmitted a data in a TTI corresponding to the first retransmission group retransmits the data in the next TTI corresponding to the same first retransmission group if the retransmission is required. This can also be equally applied to the second retransmission group and the third retransmission group.

Hereinafter, a description will be given of a sub-band hopping scheme according to one embodiment of the present invention.

In the present embodiment, the system band in one or more TTIs is divided into two or more sub-bands, and a sub-band for the frequency hopping scheme is designated to FDMA-multiplex a data transmitted by the frequency hopping scheme and a data not so.

In other words, in the sub-band hopping scheme proposed in the present embodiment, it is assumed that a system band to transmit an uplink data is configured to include two or more sub-bands having the same size of bandwidth. Also, a sub-band to which the frequency hopping scheme is applied can be designated among the two or more sub-bands, and the frequency hopping scheme can be applied to only the designated sub-band, or the sub-band for the frequency hopping.

The frequency hopping scheme is applied in such a manner that different sub-bands for the frequency hopping are used in a TTI or between retransmissions. In this case, the bandwidth of the sub-band for the frequency hopping is a maximum bandwidth enabling one UE to transmit a data in the frequency hopping scheme.

Figure 2:
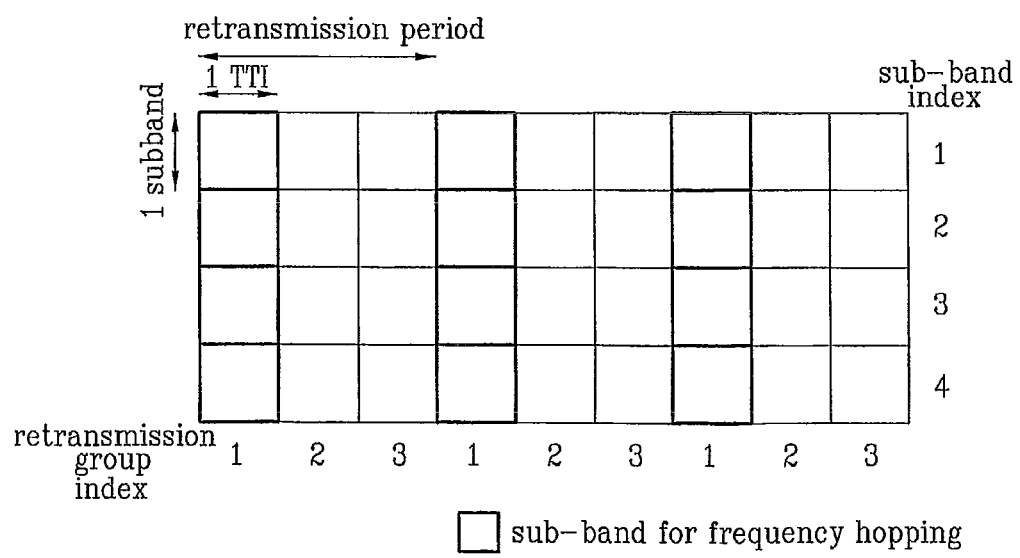
FIG. 2 is a view illustrating an example of a method for setting a sub-band for frequency hopping according to one embodiment of the present invention.

FIG. 2 is a view illustrating an example of a method for setting a sub-band for the frequency hopping according to one embodiment of the present invention.

FIG. 2 shows a case where the retransmission period is 3 TTIs and a total number of retransmission groups is 3 including first to third retransmission groups. Also, a system band to transmit an uplink data is configured to include four sub-bands with the same size of bandwidth. The sub-bands are assigned indexes, respectively, so that they are referred to as first to fourth sub-bands, respectively.

In the present embodiment, all sub-bands of a specific retransmission group are designated as sub-bands for the frequency hopping. For example, in FIG. 2, all the sub-bands of the first retransmission group are designated as sub-bands for the frequency hopping.

Here, it will be apparent to those skilled in the art that all the sub-bands of any one of the second and third retransmission groups, as well as the first retransmission group, can be designated and used as sub-bands for the frequency hopping.

Figure 3:
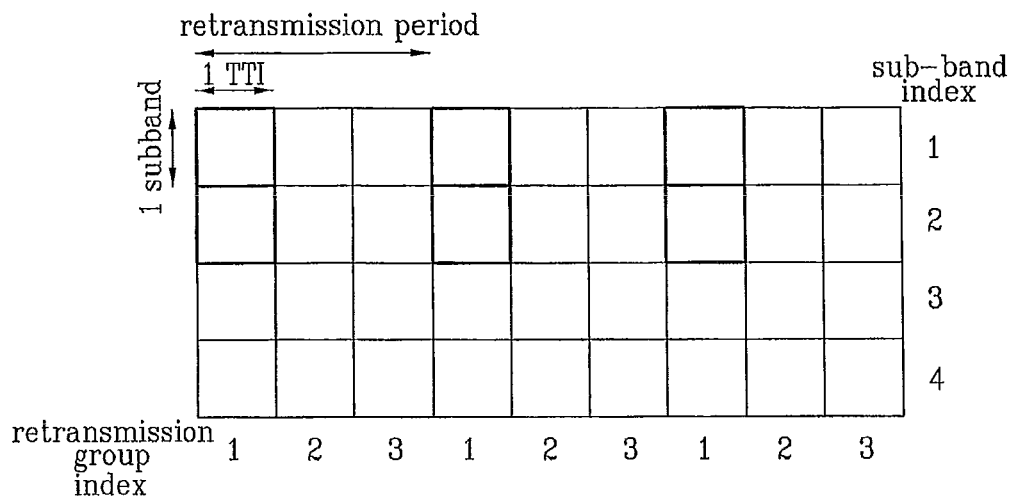
FIG. 3 is a view illustrating an example of a method for setting a sub-band for frequency hopping according to one embodiment of the present invention.

FIG. 3 is a view illustrating an example of a method for setting a sub-band for frequency hopping according to one embodiment of the present invention.

Similarly to FIG. 2, FIG. 3 shows a case where the retransmission period is 3 TTIs and total number of retransmission groups is 3 including first to third retransmission group. Also, a system band to transmit an uplink data is configured to include four sub-bands with the same size of bandwidth. Also in this case, the sub-bands are assigned indexes, respectively, so that they are referred to as first to fourth sub-bands, respectively.

In the present embodiment, a part of sub-bands of a specific retransmission group are designated as sub-bands for the frequency hopping. For example, in FIG. 3, the first and second sub-bands of the first retransmission group are designated as sub-bands for the frequency hopping.

Here, it will be apparent to those skilled in the art that a part of the sub-bands of any one of the second and third retransmission groups, as well as the first retransmission group, can also be designated, and, when a part of the sub-bands are designated, any one or more of the total four sub-bands, besides the aforementioned first and second sub-bands, can be designated.

Figure 4:
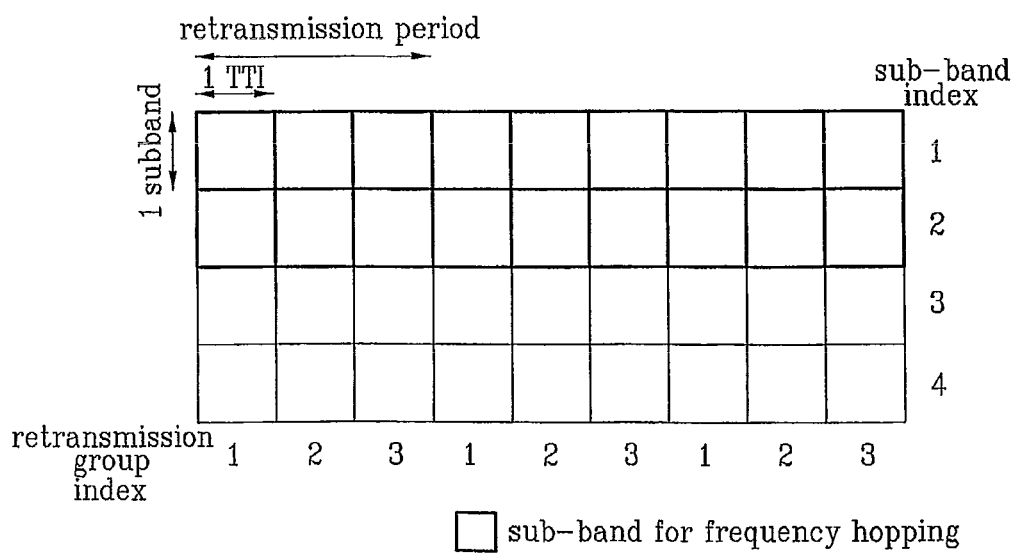
FIG. 4 is a view illustrating an example of a method for setting a sub-band for frequency hopping according to one embodiment of the present invention.

FIG. 4 is a view illustrating an example of a method for setting a sub-band for frequency hopping according to one embodiment of the present invention.

Similarly to FIG. 2, FIG. 4 shows a case where the retransmission period is 3 TTIs and total number of retransmission groups is 3 including first to third retransmission groups.

Also, a system band to transmit an uplink data is configured to include four sub-bands with the same size of bandwidth. Also in this case, the sub-bands are assigned indexes, respectively, so that they are referred to as first to fourth sub-bands, respectively.

In the present embodiment, a part of sub-bands of a specific retransmission group are designated as sub-bands for the frequency hopping, similarly to in the embodiment of FIG. 3. However, this embodiment is different from the embodiment of FIG. 3 in that two or more specific retransmission groups are designated.

For example, in FIG. 4, the first and second sub-bands of the first and second retransmission groups are designated as sub-bands for the frequency hopping.

Here, it will be apparent to those skilled in the art that, as stated above, some of the sub-bands of two or more of the first, second and third retransmission groups, as well as the first and second retransmission groups, can also be designated and used as sub-bands for the frequency hopping, and, when some of the sub-bands are designated, any one or more of the total four sub-bands, besides the aforementioned first and second sub-bands, can be designated and used as sub-bands for the frequency hopping.

Also, the same sub-bands may be designated with respect to all the two or more retransmission groups, or different sub-bands may be designated with respect to each of the retransmission groups.

Figure 5:
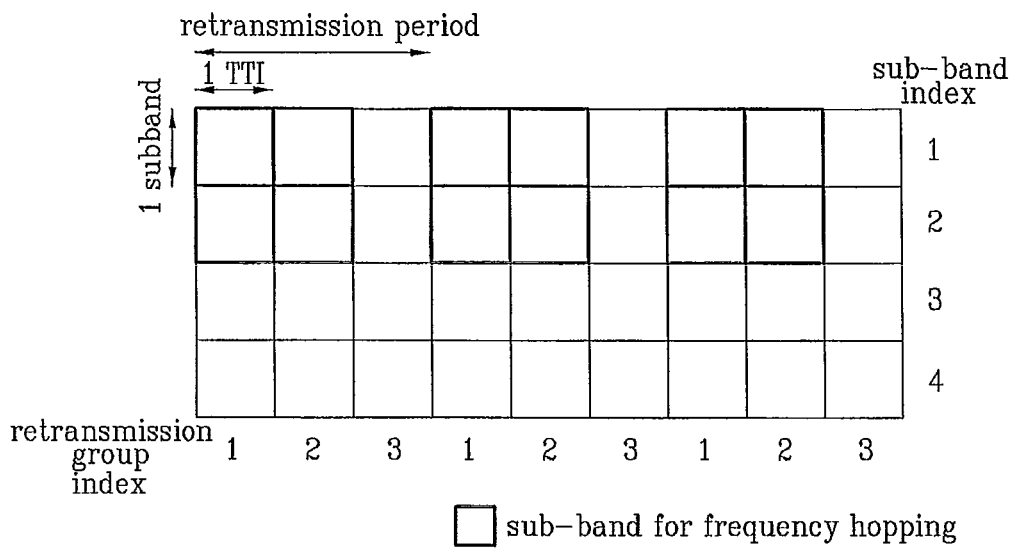
FIG. 5 is a view illustrating an example of a method for setting a sub-band for frequency hopping according to one embodiment of the present invention.

FIG. 5 is a view illustrating an example of a method for setting a sub-band for frequency hopping according to one embodiment of the present invention.

Similarly to FIG. 2, FIG. 5 shows a case where the retransmission period is 3 TTIs and total number of retransmission groups is 3 including first to third retransmission groups. Also, a system band to transmit an uplink data is configured to include four sub-bands with the same size of bandwidth. Also in this case, the sub-bands are assigned indexes, respectively, so that they are referred to as first to fourth sub-bands, respectively.

In the present embodiment, a part of sub-bands of all retransmission groups are designated as sub-bands for the frequency hopping. For example, in FIG. 5, the first and second sub-bands of the first to third retransmission groups, that is, all the retransmission groups, are designated as sub-bands for the frequency hopping.

Here, it will be apparent to those skilled in the art that, as stated above, when a part of sub-bands are designated, any one or more of the total four sub-bands, besides the aforementioned first and second sub-bands, can be designated and used as sub-bands for the frequency hopping.

By designating a sub-band for the frequency hopping and applying the frequency hopping scheme to the designated sub-band, as stated above with reference to FIG. 2 to FIG. 5, it is possible to secure sub-bands as many as necessary in advance so that the frequency hopping scheme can be similarly applied in the case where a retransmission data of a data transmitted by the frequency hopping scheme is transmitted.

The number of sub-bands and bandwidth information of sub-bands in a system band capable of transmitting an uplink data, or information about sub-bands for the frequency hopping in the system band can be transmitted over a downlink broadcast channel or predefined in a standard so that it can be known by all UEs in a cell.

Hereinafter, a description will be given of a method for transmitting information about a set sub-band for the frequency hopping.

UEs in a cell must be able to know information about sub-bands for the frequency hopping. For this reason, a base station can broadcast information related to sub-bands for the frequency hopping to within a cell whenever necessary or periodically.

Assume that M sub-bands are defined in a system band and a synchronized data retransmission period is L TTIs. The base station can broadcast information about whether the frequency hopping scheme is applied to each of the M sub-bands of each of the L retransmission groups. Alternatively, in order to simplify an environment configuration, the base station may reduce the amount of broadcast information by setting sub-bands to which the frequency hopping scheme is applied, according to a predetermined rule.

For example, in the case where all sub-bands of a specific retransmission group are designated as sub-bands to which the frequency hopping scheme is applied, as described with reference to FIG. 2, the base station can assume that the frequency hopping scheme is applied to all sub-bands for a retransmission group to which the frequency hopping scheme is applied, and broadcast information about whether the frequency hopping scheme is applied to each of the L retransmission groups.

Also, in the case where a part of sub-bands of one specific retransmission group or two or more specific retransmission groups are designated as sub-bands for the frequency hopping, as described with reference to FIG. 3 and FIG. 4, particularly, in the case where it is assumed that the same sub-bands are used for the frequency hopping in designated specific retransmission groups, the base station can broadcast information about whether the frequency hopping scheme is applied to each of the M sub-bands of each of the L retransmission groups, and information about whether the frequency hopping scheme is applied to each of the L retransmission groups.

Also, in the case where a part of sub-bands of all retransmission groups are designated as sub-bands for the frequency hopping, as described with reference to FIG. 5, the base station assumes that, with respect to all retransmission groups, the frequency hopping scheme is applied to sub-bands for the frequency hopping scheme, and broadcast information about whether the frequency hopping scheme is applied to each of the M sub-bands.

To put it in more detail in connection with the case of FIG. 4, four sub-bands are defined in a system band and a synchronized data retransmission period is 3 TTIs. That is, FIG. 4 shows an example where the frequency hopping scheme is applied to sub-bands designated as combinations of (m,l)=(1, 1), (2,1), (1,2) and (2,2) when (M,L)=(4,3). Here, m and l signify a sub-band index and a retransmission group index, respectively.

In this case, the base station can notify UEs in a cell of information about sub-bands for the frequency hopping by broadcasting information about the first and second sub-bands and information about the first and second retransmission groups.

When sub-bands for the frequency hopping and sub-bands not for the frequency hopping are designated in the uplink time-frequency domain as stated above, the frequency hopping scheme is carried out in the following manner. As stated previously, the frequency hopping scheme can be broadly classified into the intra-TTI frequency hopping and the inter-retransmission frequency hopping, each of which will hereinafter be described. Further, each embodiment will be described based on the fact that (M,L)=(4,3) and (m,l)=(1,1), (2,1) and (4,1) are designated as sub-bands to which the frequency hopping scheme is applied.

In one embodiment for applying the present scheme to the system, each UE, with respect to uplink transmission based on the synchronized HARQ scheme, performs the initial transmission of each data based on scheduling from a scheduler of the base station and transmits a retransmission of the data using a predetermined time interval and frequency band.

As a result, it is assumed that each UE applies the frequency hopping scheme to retransmission or next slot transmission according to the above-mentioned rules when a band scheduled by the base station scheduler is a sub-band to which the frequency hopping scheme is applied, and generally uses the same band for retransmission or next slot transmission when uplink transmission is scheduled with respect to a sub-band to which the frequency hopping scheme is not applied.

Figure 6:
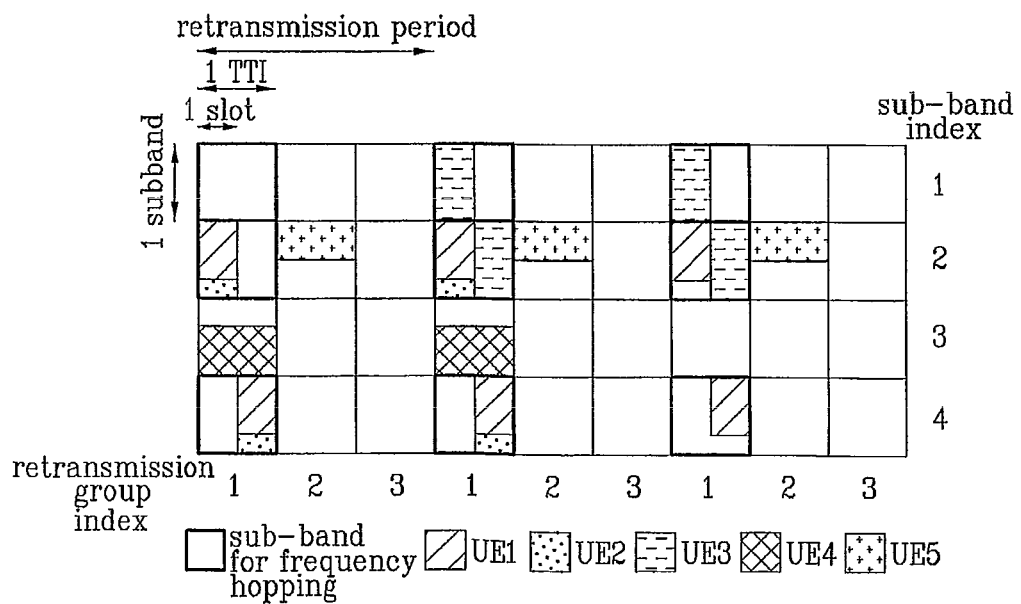
FIG. 6 is a view illustrating a frequency hopping scheme according to one embodiment of the present invention.

FIG. 6 is a view illustrating a frequency hopping scheme according to one embodiment of the present invention.

First, intra-TTI frequency hopping will be described. For application of intra-TTI frequency hopping scheme, one TTI can be divided into two or more time slots and the frequency hopping can be performed in each of the divided slots in the TTI with respect to sub-bands for the frequency hopping.

The hopping order of sub-bands at which the frequency hopping is performed may be predefined and fixedly used on the system, or may be notified to UEs through the above-stated frequency hopping sub-band information broadcasting method when being designated or changed.

In the embodiment of FIG. 6, one TTI is divided into two slots and the frequency hopping is performed in the order of first sub-band→second sub-band→fourth sub-band→first sub-band→(m=1→m=2→m=4→m=1→). The frequency hopping scheme is applied to a UE 1, UE 2 and UE 3, each of which transmits a data using a designated sub-band for the frequency hopping.

For example, the UE 1 starts transmission of a data at the second sub-band, (m,l)=(2,1), in the first slot and transmits the data at the fourth sub-band, (m,l)=(4,1), in the next slot of the same TTI, thus completing the data transmission in the given TTI. This is similarly applied to the subsequent retransmission.

In FIG. 6, two retransmissions are made with respect to the data of the UE 1. Although the two retransmissions are additionally provided for the data of the UE 1, the frequency hopping is not applied at a retransmission start time. In other words, a sub-band at which the retransmission is started is the same as the sub-band at which the initial transmission is started. Each of the UE 2 and UE 3 performs one retransmission differently from the UE 1, but transmits a data using the intra-TTI frequency hopping in the same manner as the UE 1.

A UE 4 and UE 5 each transmit a data using a sub-band not for the frequency hopping, namely, using the same sub-band in one TTI without using the frequency hopping scheme. As shown in FIG. 6, each UE can be scheduled to perform data transmission at only some sub-bands and scheduled to, even though a sub-band for transmission of a data in the frequency hopping scheme is changed to another one, maintain the same relative data transmission position in the changed sub-band.

Figure 7:
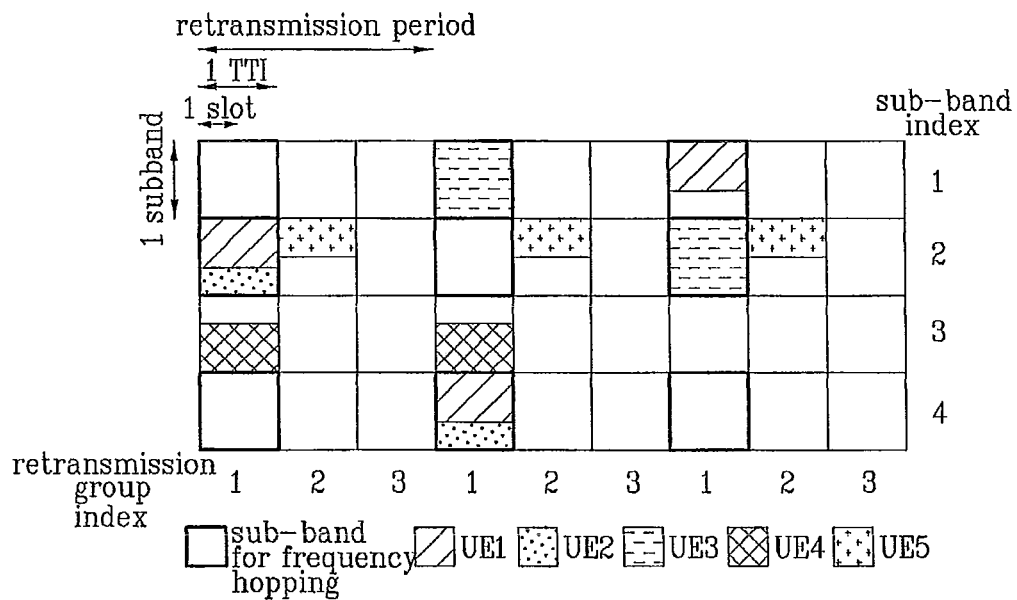
FIG. 7 is a view illustrating a frequency hopping scheme according to one embodiment of the present invention.

FIG. 7 is a view illustrating a frequency hopping scheme according to one embodiment of the present invention.

Inter-retransmission frequency hopping will be described with reference to FIG. 7. The inter-retransmission frequency hopping is basically the same as the intra-TTI frequency hopping, but is different from the intra-TTI frequency hopping in that the frequency hopping scheme is not applied to time slots in one TTI and is applied whenever retransmission is performed.

The hopping order of sub-bands at which the frequency hopping is performed may be predefined and fixedly used on the system, or may be notified to UEs through the above-stated frequency hopping sub-band information broadcasting method when being designated or changed.

In the embodiment of FIG. 7, the frequency hopping is performed in the order of first sub-band→second sub-band→fourth sub-band→first sub-band→(m=1→m=2→m=4→m=1→). The frequency hopping scheme is applied to a UE 1, UE 2 and UE 3, each of which transmits a data using a designated sub-band for the frequency hopping.

For example, the UE 1 transmits a data at the second sub-band, (m,l)=(2,1), and performs first and second retransmissions, respectively, using the sub-bands for the frequency hopping in the order of the fourth sub-band and first sub-band, (m,l)=(4,1) and (1,1), according to the frequency hopping order after failing in the data transmission.

In the embodiment of FIG. 7, each of the UE 2 and UE 3 performs one retransmission. For the retransmission, each of the UE 2 and UE 3 performs the retransmission in the frequency hopping scheme in the same manner as the application of the frequency hopping scheme to the UE 1. A UE 4 and UE 5 each transmit and retransmit a data at a sub band not for the frequency hopping scheme.

Comparing with the case of FIG. 6, the case of FIG. 7 is different from the case of FIG. 6 in that the frequency hopping is not performed in one TTI and a data is transmitted by using the same sub-band for the frequency hopping with respect to all slots in one TTI.

Also, the present embodiment is different in data retransmission from the embodiment of FIG. 6 in that the frequency hopping is applied at the retransmission start time in this embodiment, whereas the frequency hopping is not applied at the retransmission start time in the embodiment of FIG. 6.

Figure 8:
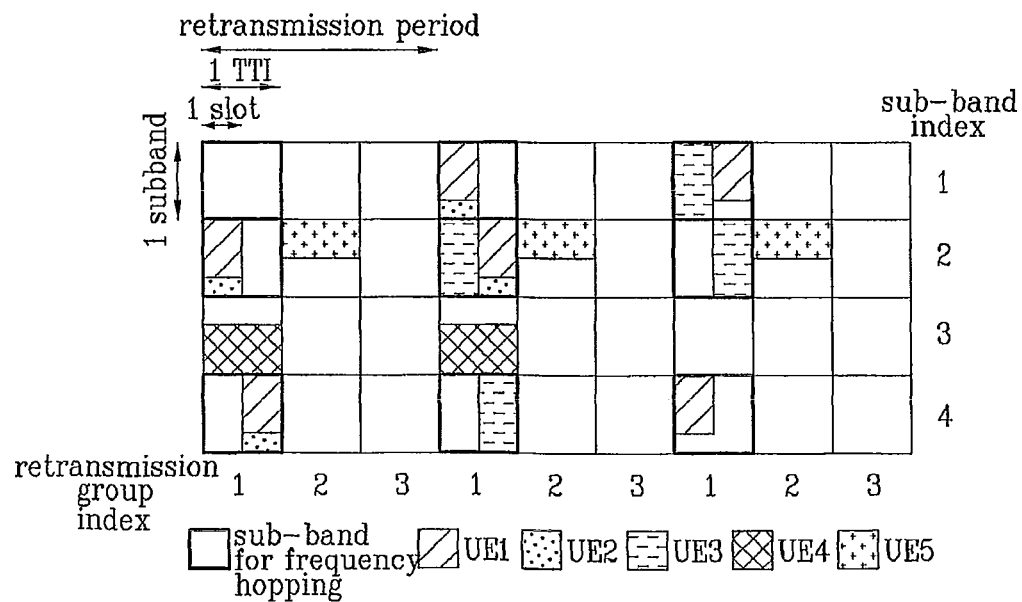
FIG. 8 is a view illustrating a frequency hopping scheme according to one embodiment of the present invention.

FIG. 8 is a view illustrating a frequency hopping scheme according to one embodiment of the present invention.

With reference to FIG. 8, a description will hereinafter be given of an example of application of a combination of the above-stated intra-TTI frequency hopping and inter-retransmission frequency hopping.

The same method as the above can be consistently applied for the application of the combination of the above-stated intra-TTI frequency hopping and inter-retransmission frequency hopping. That is, as stated above, for application of intra-TTI frequency hopping scheme, one TTI can be divided into two or more time slots and the frequency hopping can be performed in each of the divided slots in the TTI with respect to sub-bands to which the frequency hopping scheme is applied.

The hopping order of sub-bands at which the frequency hopping is performed may be predefined and fixedly used on the system, or may be notified to UEs through the above-stated frequency hopping sub-band information broadcasting method when being designated or changed.

In the embodiment of FIG. 8, one TTI is divided into two slots and the frequency hopping is performed in the order of first sub-band→second sub-band→fourth sub-band→first sub-band→(m=1→m=2→m=4→m=1→). The frequency hopping scheme is applied to a UE 1, UE 2 and UE 3, each of which transmits a data using a designated sub-band for the frequency hopping.

For example, the UE 1 starts transmission of a data at the second sub-band, (m,l)=(2,1), in the first slot and completes the data transmission at the fourth sub-band, (m,l)=(4,1), in the next slot of the same TTI. That is, the frequency hopping scheme is applied on a slot basis in one TTI.

Also, in the case of data retransmission, the UE 1 retransmits the data while moving the sub-bands in the order of first sub-band→second sub-band→fourth sub-band→first sub-band→(m=1→m=2→m=4→m=1→) according to the frequency hopping order. That is, because the data transmission in the second slot for the initial transmission has been performed at the fourth sub-band, (m,l)=(4,1), the next order, or the first sub-band, (m,l)=(1,1), is used to transmit the data in the first slot for the first retransmission. Then, the second sub-band, (m,l)=(2,1), is used to transmit the data in the second slot for the first retransmission.

The UE 1 performs the second retransmission in the same manner. That is, the UE 1 transmits the data in the first slot for the second retransmission using the fourth sub-band, (m,l)=(4,1). Then, the UE 1 transmits the data in the second slot for the second retransmission using the first sub-band, (m,l)=(1,1).

In the embodiment of FIG. 8, each of the UE 2 and UE 3 performs one retransmission. For the retransmission, each of the UE 2 and UE 3 performs the retransmission using the combination of the intra-TTI frequency hopping and inter-retransmission frequency hopping in the same manner as the UE 1. A UE 4 and UE 5 each transmit and retransmit a data at a sub-band to which the frequency hopping scheme is not applied.

In the above-described frequency hopping scheme using a plurality of sub-bands, sub-bands in each sub-band-retransmission group combination can be designated separately as sub-bands to which the inter-retransmission frequency hopping is applied, sub-bands to which the intra-TTI frequency hopping is applied, or sub-bands to which the inter-retransmission/intra-TTI frequency hopping combination is applied.

Also, in order to effectively multiplex sub-bands to which the frequency hopping scheme is applied and sub-bands to which the frequency hopping scheme is not applied, according to the neighbor cell interference characteristics and traffic amount of each cell, the number of sub-bands in a system band, sub-band-retransmission group combinations using the frequency hopping scheme, and the frequency hopping order of sub-bands used for the frequency hopping scheme can be determined in each cell in consideration of the neighbor cell interference characteristics and traffic amount of each cell.

Further, information about the number of sub-bands in a system band, sub-band-retransmission group combinations using the frequency hopping scheme, and the frequency hopping order of sub-bands used for the frequency hopping scheme, determined in each cell, can be broadcast from the base station to UEs in each cell whenever necessary. Alternatively, the base station may periodically broadcast such information to UEs in each cell.

In the above-described embodiments, it is assumed that each UE applies the frequency hopping scheme to retransmission or next slot transmission according to the above-mentioned rules when a band scheduled by the base station scheduler is a sub-band to which the frequency hopping scheme is applied, and generally uses the same band for retransmission or next slot transmission when uplink transmission is scheduled with respect to a sub-band to which the frequency hopping scheme is not applied.

Alternatively, in another embodiment of the present invention, the above-described frequency hopping scheme is applied in the same manner on the assumption that a UE, scheduled to transmit a data at a certain period or for a certain time beginning with a sub-band to which a given frequency hopping scheme is applied at a given time, transmits an uplink data according to the above-stated frequency hopping rules irrespective of whether the uplink data transmission is data retransmission or new data transmission.

Hereinafter, a description will be given of a binary tree frequency hopping scheme according to an alternative embodiment of the present invention.

In the binary tree frequency hopping scheme proposed in the present embodiment, it is assumed that a band to which the frequency hopping scheme is applied, in a system band, consists of RB (resource block) units, each including one or more sub-carriers. A virtual index is assigned to each RB using a binary tree format, and a specific hopping rule is applied to each RB.

In the binary tree frequency hopping scheme proposed in the present embodiment, a system band capable of transmitting an uplink data is broadly divided into two bands, a band to which the frequency hopping scheme is applied and a band to which the frequency hopping scheme is not applied, with respect to each retransmission group. The band to which the frequency hopping scheme is applied and the band to which the frequency hopping scheme is not applied, divided in this manner, each may consist of consecutive sub-carriers or non-consecutive sub-carriers. Preferably, each band consists of consecutive sub-carriers when the SC-FDMA or IFDMA scheme is applied as stated previously. According to a given definition, the entire system band for uplink data transmission in each of one or more specific retransmission groups may be designated for use in the frequency hopping scheme.

Figure 9:
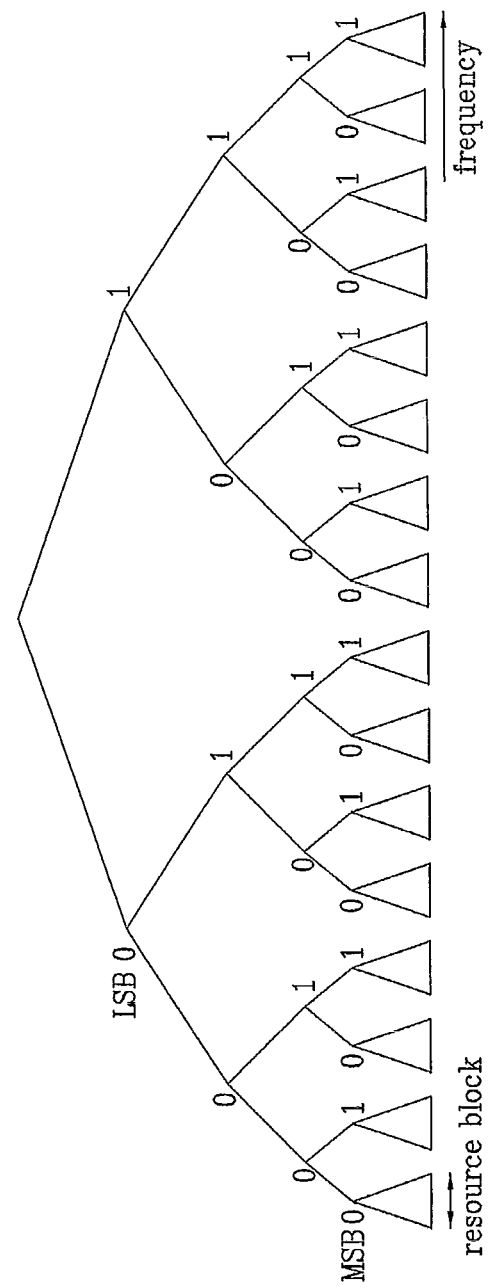
FIG. 9 is a view illustrating a frequency hopping scheme according to an alternative embodiment of the present invention.

FIG. 9 is a view illustrating a frequency hopping scheme according to an alternative embodiment of the present invention.

With reference to FIG. 9, a detailed description will hereinafter be given of an example of a virtual index assignment method for application of the binary tree frequency hopping scheme.

Frequency resources in a band (hereinafter abbreviated to a frequency hopping band) to which the frequency hopping scheme is applied can include $2^N$ (N=1, 2, 3, . . . ) sub-carrier RBs which are consecutive on the frequency axis, as in the example of FIG. 9. FIG. 9 shows a case where N=4, namely, the frequency hopping band includes 16 RBs.

A virtual index can be assigned as a binary number to each RB based on its position in a tree structure at a specific time. In the embodiment of FIG. 9, a bit 0 is assigned to the left one of two branches divided at each node in a tree, and a bit 1 is assigned to the right branch. Of course, indexing in the opposite direction, namely, assigning a bit 1 to the left branch and a bit 0 to the right branch is also possible with the same effect.

However, in the following description of the present embodiment, it is assumed that a bit 0 is assigned to the left branch and a bit 1 is assigned to the right branch. Also, a bit assigned to a branch divided at a top node is defined as a least significant bit (LSB), and a bit assigned to a branch divided at a bottom node is defined as a most significant bit (MSB).

That is, a virtual index to each RB can be defined by reading bits assigned to branches sequentially from a bit assigned to a branch divided at the bottom node to a bit assigned to a branch divided at the top node.

As a result, in the case where virtual index information regarding each RB is represented as a binary number for the virtual index assignment using the above-stated method, it can be seen from FIG. 9 that a virtual index is assigned to each RB in such a manner that 0000 is assigned to the leftmost RB, 1000 to the next RB, and 0100, . . . , 0111 and 1111 respectively from the subsequent RB to the last, sixteenth RB.

Figure 10:
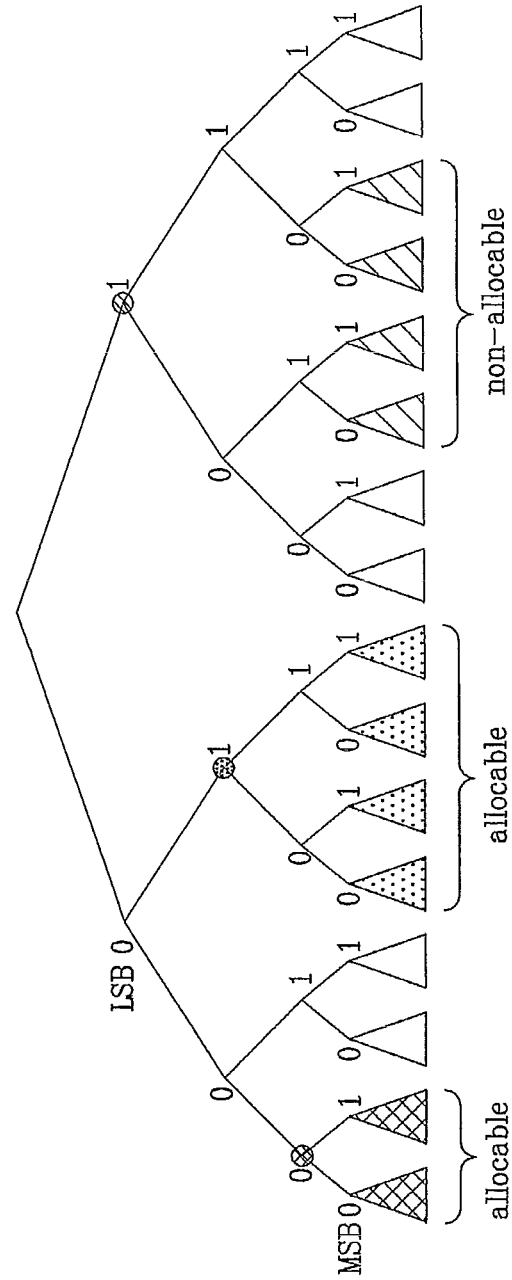
FIG. 10 is a view illustrating a frequency hopping scheme according to an alternative embodiment of the present invention.

FIG. 10 is a view illustrating a frequency hopping scheme according to an alternative embodiment of the present invention.

When the uplink access is made in the SC-FDMA series scheme as stated previously, data transmission by one UE at one time needs to be performed through consecutive sub-carriers. For this reason, even though the intra-TTI or inter-retransmission frequency hopping is applied, it is preferable that sub-carriers through which one UE transmits a data at one time should maintain consecutiveness on the frequency axis. A description will hereinafter be given of a method for allocating RBs for uplink transmission of one UE in consideration of such consecutiveness maintenance of sub-carriers.

In order to perform the frequency hopping in the binary tree frequency hopping scheme according to this embodiment, a bandwidth scheduled for one UE to transmit an uplink data in the frequency hopping scheme is limited to a band corresponding to a multiple of 2 of a RB. Blocks scheduled for one UE to transmit data must be all consecutive blocks belonging to and beneath any one node determined in the tree structure of FIG. 9. Therefore, in the embodiment of FIG. 10, 1, 2, 4, 8 or 16 blocks consecutive on the frequency axis, belonging to and beneath one node, can be scheduled for one UE.

Referring to FIG. 10, examples of RB allocation using the above RB allocation rule can be seen. A RB of a virtual index 0000 and a RB of a virtual index 1000 can be allocated to one UE because they are consecutive RBs belonging to and beneath one node. Similarly, a RB of a virtual index 0010, a RB of a virtual index 1010, a RB of a virtual index 0110, and a RB of a virtual index 1110 can also be allocated to one UE because they are consecutive RBs belonging to and beneath one node.

However, a RB of a virtual index 0101, a RB of a virtual index 1101, a RB of a virtual index 0011, and a RB of a virtual index 1011 are not consecutive RBs belonging to and beneath one node. That is, the RB of the virtual index 0101 and the RB of the virtual index 1101, and the RB of the virtual index 0011 and the RB of the virtual index 1011 are RBs belonging to different nodes. As a result, in this case, due to the aforementioned limitation, it is preferable that these RBs not be allocated to one UE.

In consideration of the above factors, the base station scheduler can determine a band within the frequency hopping band at which each UE in a cell is to transmit an uplink data packet. Also, the base station notifies each UE of information about the determined uplink band through a downlink control signal. At this time, the base station can notify each UE of information about a band, or RBs, at which each UE is to perform data transmission, by directly using virtual indexes. Alternatively, the base station may not directly use virtual indexes, but allow each UE to analogize the virtual indexes by assuming that the frequency hopping is performed according to a predetermined specific rule.

For example, the base station can assign virtual indexes to frequency blocks of the entire uplink system band irrespective of the frequency hopping band and schedule an uplink data transmission band based on the assigned indexes. In this case, each UE converts virtual indexes of RBs of a band scheduled therefor. Then, the UE attempts initial transmission of a data through the scheduled RBs.

When the scheduled band belongs to the frequency hopping band, the UE acquires another virtual index by varying virtual indexes of blocks to be used for data transmission according to a specific rule. Then, the UE performs data transmission based on the frequency hopping scheme using a RB corresponding to the acquired virtual index.

In this manner, the data transmission based on the binary tree frequency hopping scheme can be performed according to virtual indexes and a specific rule for acquisition of a virtual index of a RB for the frequency hopping.

In the case where the above-stated intra-TTI frequency hopping is applied, upon a slot transition in a TTI, each UE acquires a virtual index of a RB for the frequency hopping according to the specific rule and performs data transmission based on the frequency hopping scheme using the RB assigned the acquired virtual index.

Also, in the case where the inter-retransmission frequency hopping is applied, whenever a data is retransmitted, each UE acquires a virtual index of a RB for the frequency hopping according to the specific rule and performs data transmission based on the frequency hopping scheme using the RB assigned the acquired virtual index.

Similarly, in the case where both the intra-TTI frequency hopping and inter-retransmission frequency hopping are applied, upon retransmission based on a slot transition in a TTI and upon every slot transition in a retransmission TTI, each UE acquires a virtual index of a RB for the frequency hopping according to the specific rule and performs data transmission based on the frequency hopping scheme using the RB assigned the acquired virtual index.

The following equation 1 represents an example of the specific rule for acquisition of a virtual index of a RB for the frequency hopping.

$$i(n+1)=f(i(n),k) \bmod M \quad \text{[Equation 1]}$$

In the above equation 1, i(n) is a virtual index of a block used in a previous data transmission slot (or TTI), i(n+1) is a virtual index of a block to be used in a current data transmission slot (or TTI), k is a constant, M is the number of blocks in the frequency hopping band, and f(x,y) is a function of x and y.

The following equation 2 represents an example of the specific rule in which a simple count is applied using k=1 in the equation 1.

$$i(n+1)=f(i(n)+1) \bmod M \quad \text{[Equation 2]}$$

Similarly to in the above equation 1, in the equation 2, i(n) is a virtual index of a block used in a previous data transmission slot (or TTI), i(n+1) is a virtual index of a block to be used in a current data transmission slot (or TTI), and M is the number of blocks in the frequency hopping band.

From comparison with the equation 1, it can be seen that 1 is used as the value of k and x+y is used as f(x,y), a function of x and y.

By determining a RB for next transmission according to the above specific rule, it is possible to use all blocks in the frequency hopping band effectively for the frequency hopping scheme.

A UE receives virtual index information about a RB to be used for initial uplink data transmission from the base station and transmits uplink data using the RB, and then acquires virtual index information about a RB for the next transmission through the above equation 1, or more particularly equation 2.

Figure 11:
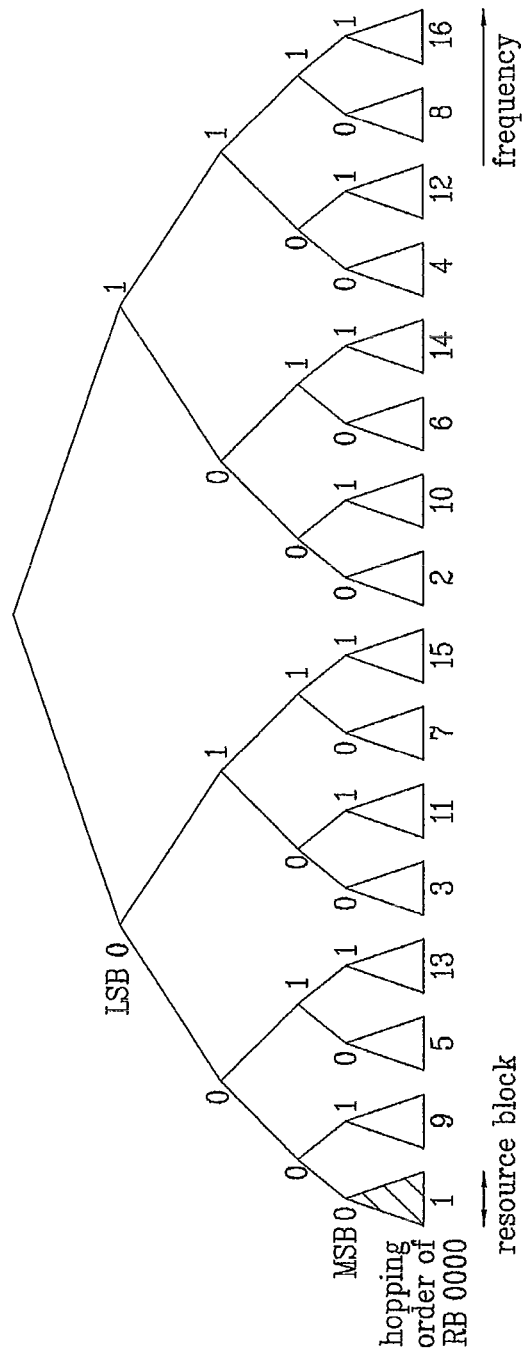
FIG. 11 is a view illustrating a frequency hopping scheme according to an alternative embodiment of the present invention.

FIG. 11 is a view illustrating a frequency hopping scheme according to an alternative embodiment of the present invention.

FIG. 11 shows an example where the specific rule proposed in the equation 2 is used under the condition that the binary tree frequency hopping described with reference to FIG. 9 is applied. In particular, FIG. 11 shows a frequency hopping order starting with a RB assigned a virtual index 0000.

In FIG. 11, a number marked beneath each RB represents the order of RBs that a UE, having used the RB assigned the virtual index 0000 for the initial data transmission, uses for the subsequent data transmissions.

In the example where the equation 2 is applied, a RB assigned a virtual index 0001, (0000+1) mod 16=0001, is used for the second slot or TTI transmission, and a RB assigned a virtual index 0010, (0001+1) mod 16=0010, is used for the third slot or TTI transmission. RBs to be used for the subsequent transmissions can be seen in succession through this method.

The following equation 3 represents another example of the specific rule for acquisition of a virtual index of a RB for the frequency hopping.

$$i(n+1)=f(i(n),\text{SFN})\bmod M \qquad \text{[Equation 3]}$$

Similarly to in the above equation 1, in the equation 3, i(n) is a virtual index of a block used in a previous data transmission slot (or TTI), i(n+1) is a virtual index of a block to be used in a current data transmission slot (or TTI), M is the number of blocks in the frequency hopping band, and f(x,y) is a function of x and y. Comparing with the equation 1, a system frame number (SFN) is used instead of k.

By varying virtual indexes of blocks for the frequency hopping using a count value, such as a system frame number counted as a common value by all UEs in a cell, it is possible to prevent data packets, transmitted in the frequency hopping scheme by a plurality of UEs in the cell, from colliding with one another due to a control signal error, etc.

The use of the above-described binary tree frequency hopping scheme makes it possible to effectively perform the frequency hopping scheme while maintaining consecutiveness of sub-carriers through which one UE transmits a data at one time within the frequency hopping band, and preventing the data from colliding with packets transmitted from other UEs.

The following equation 4 represents another example of the specific rule for acquisition of a virtual index of a RB for the frequency hopping.

$$i(n+1)=f(i(n),k,c)\bmod M \qquad \text{[Equation 4]}$$

Similarly to in the above equation 1, in the equation 4, i (n) is a virtual index of a block used in a previous data transmission slot (or TTI), i(n+1) is a virtual index of a block to be used in a current data transmission slot (or TTI), k is a constant, and M is the number of blocks in the frequency hopping band.

The equation 4 further includes a parameter c that can be set differently for every cell when a plurality of cells is included in a communication system. By setting different c values for respective cells, it is possible to generate different frequency hopping patterns with respect to neighboring cells.

This addition of the parameter set for every cell to the specific rule for acquisition of a virtual index of a RB for the frequency hopping makes it possible to expect the effect of avoiding a situation causing continuous interference of an arbitrary data of one cell with a specific data of a neighbor cell.

In the binary tree frequency hopping scheme, each RB can be divided into L smaller sub-RB (sub-RB) units to enable transmission of a small amount of data. In this case, a minimum bandwidth allocable for uplink data transmission by one UE at one time will be one sub-RB. Assuming that one RB consists of three sub-RB s in the example of FIG. 9, the amount of resources allocable to one UE at one time may be 1 or 2 sub-RBs, as well as 1, 2, 4, 8 or 16 RBs.

Also, in the case where an allocable band smaller than one RB is limited to only one sub-RB, a UE transmitting a data at the frequency hopping band through only one sub-RB can change a relative sub-RB position within the block at every frequency hopping time according to a rule predefined in common with respect to all UEs in a cell.

For example, provided that the first sub-RB of the RB assigned the virtual index 0000 is used for data transmission in the first slot, the second sub-RB of the RB assigned the virtual index 0001 will be used for data transmission in the next slot. As a result, it will be Possible to obtain more frequency diversity.

In one embodiment of the present invention, in an uplink synchronized data retransmission system, the base station scheduler transmits information about a band to be used for initial transmission of an uplink data by each UE through a downlink. In a binary bit frequency hopping scheme including $2^N$ RBs, the base station can notify each UE of RBs to be used for uplink transmission one by one. For example, when N=4 and the amount of allocable resources is 1, 2, 4 or 8 RBs, 16 or more bits will be required to notify each UE of use/nonuse of each of $2^4$=16 RBs using, for example, one bit.

However, instead of notifying each UE of blocks to be used for uplink transmission one by one, the base station can notify each UE of nodes to which those RBs belong, thus reducing the number of bits required for scheduling.

Figure 12:
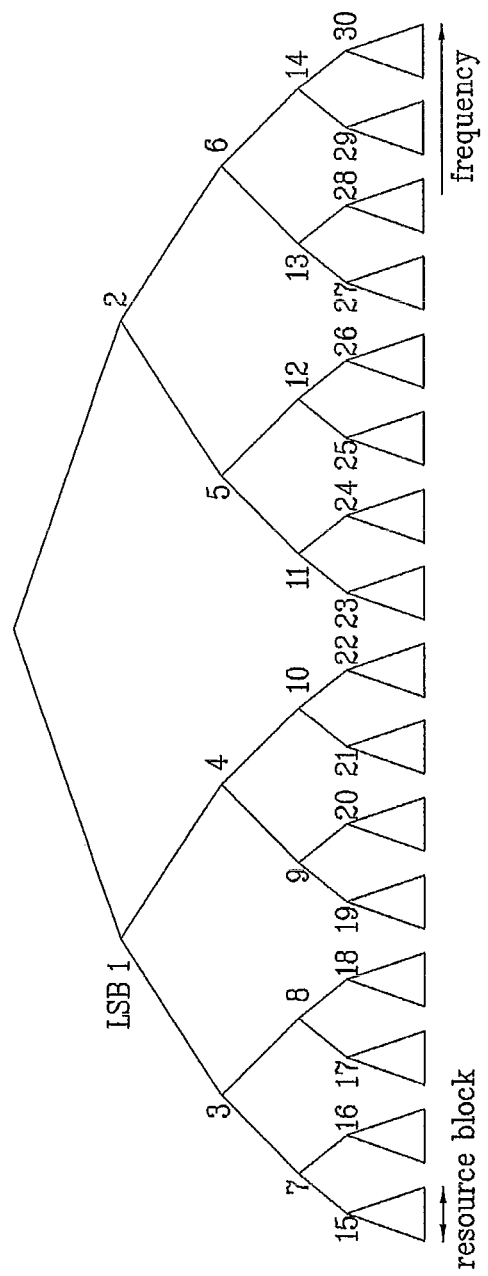
FIG. 12 is a view illustrating a frequency hopping scheme according to an alternative embodiment of the present invention.

FIG. 12 is a view illustrating a frequency hopping scheme according to an alternative embodiment of the present invention.

FIG. 12 shows an example where N=4 and the amount of allocable resources is 1, 2, 4 or 8 RBs. In this case, 16 bits are required to notify each UE of use/nonuse of each of $2^4$=16 RBs using, for example, one bit.

However, because the scheduling is actually carried out on a node basis, the base station can assign a node index to each node in a random order, as in the example of FIG. 12, and notify each UE of a node index of a node to which blocks to be scheduled belong. In this case, because $2^4+2^3+2^2+2=30$ nodes exist, only 5 bits can be used to allocate uplink transmission bands. A node index assigned to each node can be determined as shown in FIG. 12.

A node index notification method is performed in such a manner that, for example, when the right four of the RBs shown in FIG. 12 are allocated, node index information 6 is notified to a UE, thereby enabling the UE to know the corresponding RBs.

In this case, if a different indexing scheme is intended to be applied to a band to which the frequency hopping is not applied, one bit can be added to uplink band allocation information to be transmitted through a downlink, to indicate whether the scheduling is for the frequency hopping band.

Also, if the scheduling is carried out in L sub-RB units in each block as stated above, when one block is allocated, information indicating which one of the sub-RBs in the allocated block is allocated can be transmitted in addition to node information.

Further, one bit can be added to scheduled band information to indicate whether the scheduling is for one RB or for a plurality of RBs. In the case of the scheduling for a plurality of RBs, information about a corresponding node can be transmitted. In the case of the scheduling for one RB, information about a corresponding RB, namely, a RB corresponding to a bottom node in the tree, and information about an allocated sub-RB in that RB can be transmitted. This method can reduce the number of bits required for scheduled band information transmission.

Hereinafter, a description will be given of a sub-band-based binary tree frequency hopping scheme according to another embodiment of the present invention.

Figure 13:
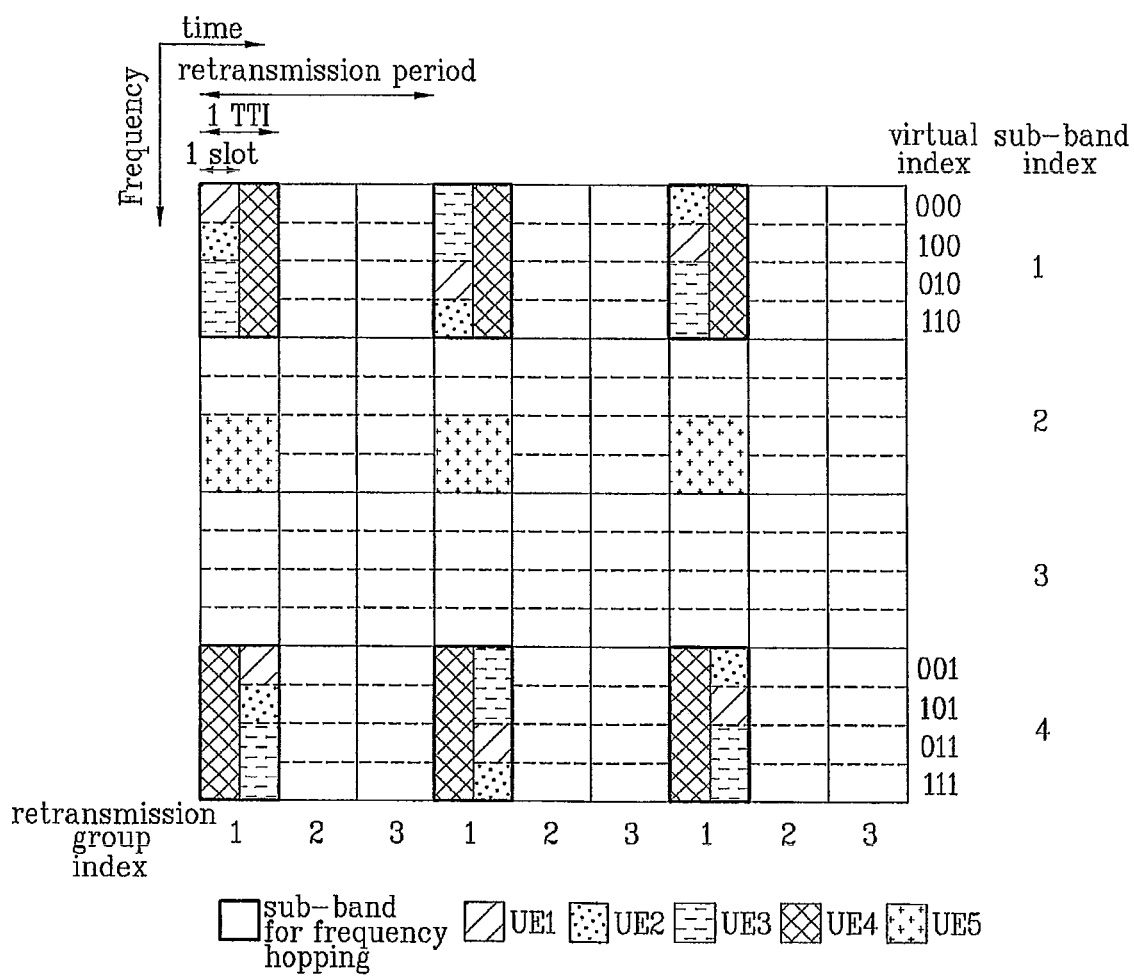
FIG. 13 is a view illustrating a frequency hopping scheme according to another embodiment of the present invention.

FIG. 13 is a view illustrating a frequency hopping scheme according to another embodiment of the present invention.

This embodiment proposes a binary tree frequency hopping scheme using a plurality of sub-bands. In this scheme, a system band capable of transmitting an uplink data is divided into M sub-bands with the same bandwidths, $2^S$ (S=0, 1, 2, 3, ...) sub-bands of which can be pre-designated for a specific retransmission group(s) as sub-bands to which the binary tree frequency hopping scheme is applied. In this case, the bandwidth of one sub-band is a maximum bandwidth for a data that one UE can transmit at one time in the frequency hopping scheme.

In the binary tree frequency hopping scheme, configuring the frequency hopping band with only sub-carriers consecutive on the frequency axis may not only limit a band capable of obtaining a frequency diversity gain, but also adversely affect the coordination of an uplink interference amount between neighboring cells. However, provided that the binary tree frequency hopping scheme is applied to each of the sub-bands constituting the system band as in the present embodiment, it is possible to widen a band capable of obtaining a frequency diversity gain and have a good effect on the coordination of an uplink interference amount between neighboring cells.

In this case, if one sub-band is composed of $2^{N-S}$ frequency blocks, all the $2^S$ frequency hopping sub-bands include $2^N$ blocks. The frequency hopping can be flexibly applied by applying a binary tree frequency hopping scheme using the above proposed N-bit virtual index to the $2^N$ blocks.

FIG. 13 shows an example where, in a synchronized uplink data transmission system in which M=4, a retransmission period is 3 TTIs, one TTI includes two frequency hopping slots and each sub-band includes four blocks, the binary tree frequency hopping scheme is applied to both intra-TTI transmission/inter-retransmission transmission when (m,l)=(1,1) and (4,1), so that five UEs can start initial transmissions in the same TTI and then each performs two retransmissions. In the example of FIG. 13, the frequency hopping scheme is not performed for a data of the UE 5, because a sub-band other than the frequency hopping sub-bands is allocated for the initial transmission.

For example, the UE 1 performs initial transmission and then performs two retransmissions. For first slot transmission of the initial transmission, the UE 1 transmits uplink data through a RB assigned a virtual index 000, included in the first sub-band. For second slot transmission of the initial transmission, the UE 1 transmits the uplink data through a RB assigned a virtual index 001, (000+1) mod 8=001. The RB assigned the virtual index 001 is one included in the second sub-band. Also, the UE 1 transmits the uplink data through a RB assigned a virtual index 010, (001+1) mod 8=010, for first slot transmission of the first retransmission, and transmits the uplink data through a RB assigned a virtual index 011, (010+1) mod 8=011, for second slot transmission of the first retransmission. Finally, the UE 1 transmits the uplink data through a RB assigned a virtual index 100, (011+1) mod 8=100, for first slot transmission of the second retransmission, and transmits the uplink data through a RB assigned a virtual index 101, (100+1) mod 8=101, for second slot transmission of the second retransmission.

The binary tree frequency hopping scheme using the plurality of sub-bands can be similarly applied to the other UEs, UE 2, UE 3 and UE 4. However, because the UE 5 is not allocated a sub-band for the frequency hopping for the initial data transmission, it also retransmits the data using the same sub-band or RB as that for the initial transmission for the subsequent retransmissions.

In another embodiment of the present invention, a UE, scheduled to transmit a data at a certain period or for a certain time beginning with a sub-band to which a given frequency hopping scheme is applied at a given time, may transmit an uplink data according to the above-stated frequency hopping rules irrespective of whether the uplink data transmission is data retransmission or new data packet transmission.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Although the frequency hopping schemes applicable to the uplink data transmission have been described through the above-stated embodiments, it will be apparent to those skilled in the art that the same or similar method as or to the transmission method described in this specification can also be used for downlink data transmission, etc., besides the uplink data transmission.

That is, it will be understood that this patent should not be limited to the specific embodiments described herein, but be accorded a right to the broadest scope consistent with the principles and novel features disclosed herein.

INDUSTRIAL APPLICABILITY

The present invention is applicable to a mobile communication system.

The invention claimed is:

1. A method for transmitting data in a mobile communication system, the method comprising:
    transmitting, by a device, first data through a first resource block; and
    transmitting, by the device, second data through a second resource block,
    wherein each of the first and second resource blocks has a virtual index assigned to a corresponding node of a binary tree structure,
    wherein the virtual index is assigned according to the following equation:

$i(n+1)=f(i(n),k) \bmod M$, where i(n) denotes a virtual index of a n-th resource block for transmission of a n-th data, f(x, y) is a function of x and y, k denotes a constant, M denotes a number of resource blocks in a frequency band, n denotes an integer equal to or more than 0, and i(0) denotes an initial virtual index of an initial resource block for transmission of initial data and is received from a base station.

2. The method according to claim 1, wherein the first data and the second data are included in one data packet and are transmitted through a first slot and a second slot in a same TTI, respectively.

3. The method according to claim 1, wherein the second data is a retransmission data of the first data.

4. The method according to claim 1, wherein, when one or more resource blocks are allocated for transmission of the first data, the allocated one or more resource blocks are included in resource blocks having virtual indexes assigned to nodes belonging to a same upper node in the binary tree structure.

5. The method according to claim 4, further comprising receiving node index information.

6. The method according to claim 1, wherein the first and second resource blocks are associated with a sub-band to which a frequency hopping scheme is applied, in the system band of the mobile communication system.

7. The method according to claim 1, wherein the f(i(n), k) corresponds to i(n)+1.

8. A method for receiving data in a mobile communication system, the method comprising:

receiving, by a device, first data through a first resource block; and receiving, by the device, second data through a second resource block, wherein each of the first and second resource blocks has a virtual index assigned to a corresponding node of a binary tree structure, wherein the virtual index is assigned according to the following equation:

$$i(n+1) = f(i(n), k) \bmod M,$$

where i(n) denotes a virtual index of a n-th resource block for reception of a n-th data, f(x, y) is a function of x and y, k denotes a constant, M denotes a number of resource blocks in a frequency band, n denotes an integer equal to or more than 0, and i(0) denotes an initial virtual index of an initial resource block for transmission of initial data.

9. The method according to claim 8, wherein the f(i(n), k) corresponds to i(n)+1.

\* \* \* \* \*